United States Patent
Mathias et al.

(10) Patent No.: US 6,425,630 B1
(45) Date of Patent: Jul. 30, 2002

(54) GUIDE RAIL ASSEMBLY

(75) Inventors: Rainer Mathias, Tutzing; Burkhard Reinsch, Neuried, both of (DE)

(73) Assignee: Webasto Vehicle Systems International GmbH, Stockdorf (DE)

( * ) Notice: Subject to any disclaimer, the term of this patent is extended or adjusted under 35 U.S.C. 154(b) by 0 days.

(21) Appl. No.: 09/661,368

(22) Filed: Sep. 13, 2000

(30) Foreign Application Priority Data

Sep. 13, 1999 (DE) .......................................... 199 43 715

(51) Int. Cl.⁷ ................................................. B60J 7/057
(52) U.S. Cl. ............................ 296/216.01; 296/216.08; 384/42
(58) Field of Search ............................. 296/216.08, 222, 296/223, 216.01; 384/42; 248/345.1

(56) References Cited

U.S. PATENT DOCUMENTS

| | | | | |
|---|---|---|---|---|
| 5,022,705 A | * | 6/1991 | Takahashi | 296/213 |
| 5,332,282 A | * | 7/1994 | Maeda et al. | 296/213 |
| 5,570,957 A | * | 11/1996 | Kuly et al. | 384/42 |
| 5,722,300 A | * | 3/1998 | Burkhard et al. | 384/42 X |

FOREIGN PATENT DOCUMENTS

| | | |
|---|---|---|
| DE | 1 123 719 | 9/1962 |
| GB | 437 589 | 10/1935 |
| JP | 0129617 | * 10/1979 ................. 296/222 |
| WO | WO 96/26081 | 8/1996 |

OTHER PUBLICATIONS

Minitec Profilsystem Katalog 93, pp. 124–129, English Language Description Of Relevant Portions.
Von Dipl.–ing. Gunter Erhard, Die Schnappverbindung Bei Kunststoffteilen, Kunststoffe Bd. 58, 1968, pp. 131–133.

* cited by examiner

Primary Examiner—Dennis H. Pedder
(74) Attorney, Agent, or Firm—Nixon Peabody LLP; David S. Safran

(57) ABSTRACT

A guide rail assembly for guiding drive elements and guide elements of an openable roof part of a motor vehicle, the guide rail assembly including a guide rail of metal with a cut edge on an end of the guide rail, and a protective cap on the end of the guide rail. The protective cap covers the cut edge of the end and has an inside wall which flushes aligns with an inside wall of the guide rail to thereby provide a flush and continuous surface. The protective cap is preferably made of plastic and plugged onto the end of the guide rail. The protective cap preferably includes a locking mechanism and an inwardly pointing face. The protective cap also includes insertion bevels which extends to an outwardly pointing face the protective cap and may further include an integrally molded a centering journal. In another embodiment, the guide rail may also include a lengthwise crosspiece, and the protective cap includes a corresponding extension.

12 Claims, 1 Drawing Sheet

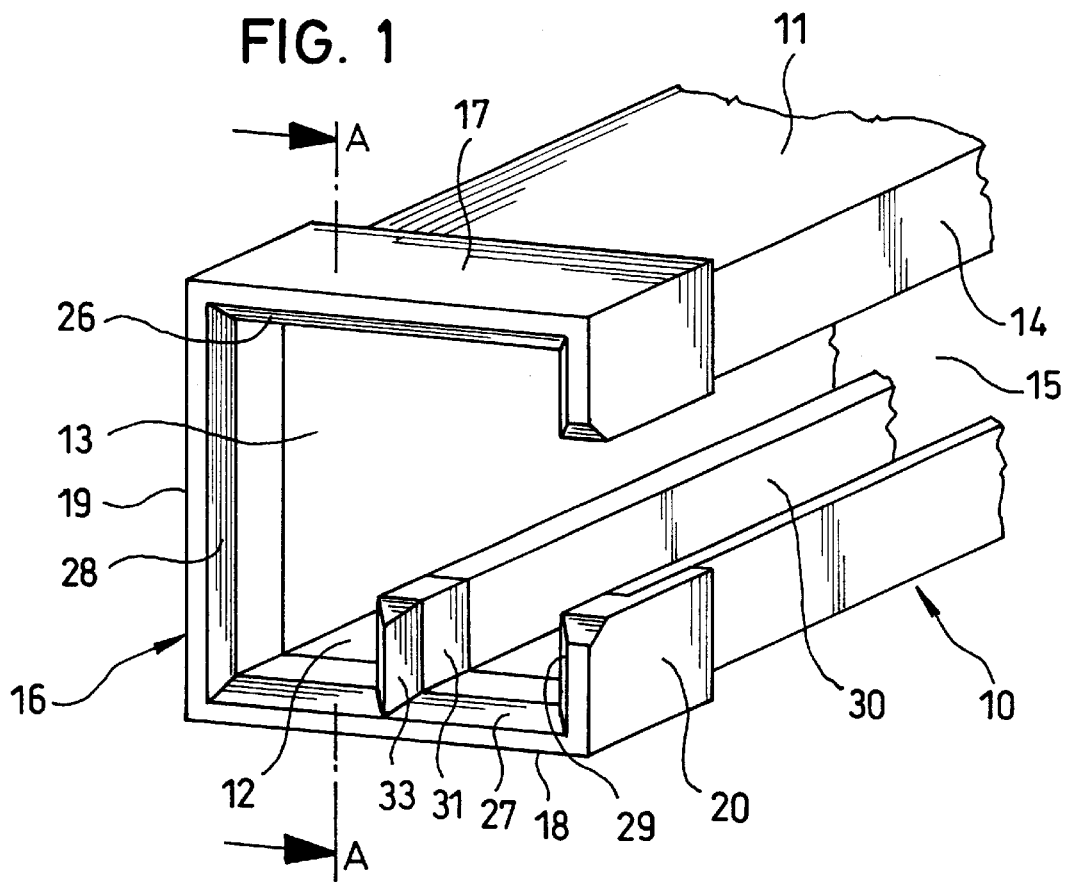
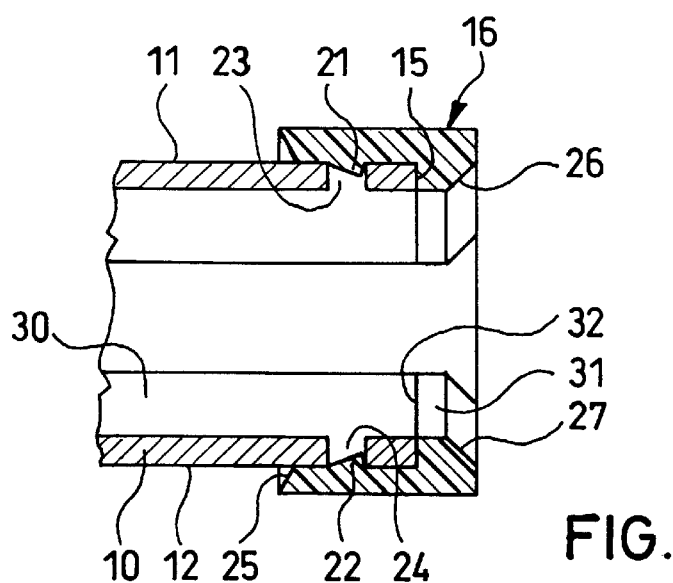

GUIDE RAIL ASSEMBLY

BACKGROUND OF THE INVENTION

1. Field of the Invention

The invention relates to guide rails that facilitates and guides the movement of drive elements and guide elements which are used in an openable roof part of a motor vehicle. In particular, the present invention relates to such metal guide rails having cut edges on the ends of the guide rail.

2. Background of the Invention

Guide rails of metal, mainly of aluminum or an aluminum alloy, are commonly used in openable roofs of a motor vehicle. Drive elements and guide elements run or move along the guide rail to thereby allow opening and closing of the openable roofs. Typically, these guide rails are fabricated by cutting metal sections to the required length. As a result of this fabrication process, these guide rails have very sharp edges on the cut ends which pose potential danger of injury during installation. In addition, the sharp edges on the cut ends also lead to wear of the drive elements or guide elements which run over guide rail transitions. Mechanical deburring of the sharp terminal ends of the guide rails or the formation of insertion bevels in the area of these edges is very expensive and does not provide an economically viable solution to the above noted problems.

SUMMARY OF THE INVENTION

A primary object of the present invention is to provide a guide rail assembly in which drive elements and guide elements that run or move over the guide rail ends are not subject to the above noted additional wear.

In accordance with the present invention, by providing a protective cap or a terminal cap, the sharp edges of the guide rail are eliminated at least on an end of the guide rail where the drive elements and guide elements run beyond the guide rail or on that end of the guide rail which lies in the transition to another guide rail. This protective cap surrounds the sharp cut edge of the guide rail so that the sharp edges do not have a detrimental effect on the drive elements and guide elements. In this manner, the guide elements or drive elements which run beyond the terminal end of the guide rail are protected from the sharp edges by the protective cap and thus, are protected against premature wear.

Basically, a variety of materials may be used for the protective cap. For reasons of cost, the protective cap is preferably made as an injected part from plastic. The protective cap can be seated either as a separate part on the pertinent end of the guide rail or it is injected directly onto this end of the guide rail. In the case of a separate part which can be slipped on to the end of the guide rail, the protective cap preferably has a lock element which interacts with a complementary lock element on the end of the guide rail to thereby ensure a permanent, but detachable seating of the protective cap on the end of the guide rail. The locking of the protective cap on the end of the guide rail can take place in a variety of different ways. In the simplest embodiment, the locking is attained by a projection on one part and a recess or depression on the other part.

To ensure smooth running of the guide elements and drive elements into and out of the guide rail over the protective cap, the protective cap has insertion bevels which run into its face. In the case in which the protective cap is made as a separate part which is plugged onto the end of the guide rail, an inwardly pointing face is formed on the protective cap.

In particular, when the protective cap is made of plastic, components of the guide rail can be integrally molded onto it. For example, a centering journal can be integrally molded on the protective cap to support the guide rail assembly to a carrier component adapted to hold the guide rail assembly.

These and other objects, features and advantages of the present invention will become more apparent from the following detailed description of the preferred embodiments of the invention when viewed in conjunction with the accompanying drawings.

BRIEF DESCRIPTION OF THE DRAWINGS

FIG. 1 shows a perspective view of a guide rail assembly in accordance with one embodiment of the present invention where a protective cap is plugged onto an end of a guide rail.

FIG. 2 shows a lengthwise cross-sectional view of the protective cap and the guide rail along A—A of FIG. 1.

DETAILED DESCRIPTION OF THE PREFERRED EMBODIMENT

FIGS. 1 and 2 generally illustrate the guide rail assembly 1 in accordance with one embodiment of the present invention in which drive elements and guide elements (not shown) that run or move over the guide rail ends are not subject to the additional wear which may cause premature failure. The guide rail assembly 1 includes a guide rail 10 which is shown in FIG. 1 in the area of one of its ends, the guide rail 10 having a general elongated shape having a substantially rectangular cross-section and includes a top 11, a bottom 12, an outer side 13 and an inner side 14. On the inner side 14, a lengthwise slot 15 is formed which extends over the entire length of the guide rail 10 and extends into the open ends 9 (only one shown) of the guide rail 10. As can be most clearly seen in FIG. 2, the face 15 of the guide rail 10 has relatively sharp edges. As previously explained, the face 15, in an unmachined state, has sharp edges because the guide rail 10 is fabricated/produced by cutting profile parts to a desired length. These sharp edges have an adverse effect on the installation capacity due to the danger of injury, and also on the guide elements or drive elements which are guided in the guide rail 10 since these elements are prematurely worn out because of these sharp edges.

In accordance with the present invention, to eliminate the detrimental effects of these sharp edges of the guide rail 10, the guide rail assembly 1 is also provided a protective cap 16 which completely covers the face 15 of the guide rail 10 with the sharp edges. The protective cap 16 is provided on at least the end of the guide rail 10 from which the guide elements emerge or the actuation elements run. In another embodiment, the protective cap 16 is on an end which is attached to another guide rail 10. This protective cap 16 is preferably made of plastic and can be injected either onto the end of the guide rail 10, or can be made as a separate part, as shown in FIGS. 1 and 2.

In the embodiment shown in FIGS. 1 and 2, the protective cap 16 has a shape generally corresponding to the cross-sectional shape of the laterally slotted guide rail 10 so that the protective cap 16 can be slipped on to the end of the guide rail 10. Accordingly, the protective cap 16 encompasses a top 17, a bottom 18, an outer side 19 and a two-part inner side 20. As can be seen, the protective cap 16 is installed to fully cover over the face 15 of the guide rail 10 and is dimensioned so that its inside wall 17.5, 18.5 flushes aligns with the inside wall 11.5, 12.5 of the guide rail 10 thereby providing a continuous flush surface.

The protective cap 16 sits on the end of the guide rail 10, extending over the end by form fit, and is locked on to the guide rail 10. For this purpose, the protective cap 16 has at least two projections 21, 22, one projecting inwardly from the top 17 and the other projecting inwardly from the bottom 18. The two projections 21, 22 project into holes or recesses 23, 24 which are formed in the top 11 and the bottom 12 of the guide rail 10. In an alternative embodiment, instead of the recesses 23, 24, cavities (not shown) an also be formed in the guide rail 10. This cavity can, for example, also be formed peripherally over the perimeter of the guide rail 10 in the form of an annular groove (not shown).

As can be most clearly seen in the cross-sectional view of FIG. 2, in order to facilitate pushing the protective cap 16 onto the end of the guide rail 10, the inwardly pointing face 25 is formed on the protective cap 16 in accordance with the illustrated embodiment, the inwardly pointing face 25 running obliquely inwardly from the outside periphery to the inside periphery of the protective cap 16. In addition, in the illustrated embodiment, to ensure the smooth movement or smooth running of the guide elements or drive elements over the outwardly pointing face 16.7 of the protective cap 16, there are insertion bevels 26, 27, 28, 29 provided on the protective cap 16 which slope downwardly from the outside toward the inside of the protective cap 16, the insertion bevels 26, 27, 28, 29 being offset inwardly to thereby provide the outwardly pointing face 16.7 of the protective cap 16. Moreover, as can be seen and as described above, the protective cap 16 extends over the face 15 to thereby cover the sharp edges of the guide rail 10 while the flush alignment of the inside periphery of the protective cap 16 to that of the guide rail 10 provides a flush and continuous surface that ensures smooth movement or smooth running of the guide elements along the guide rail 10.

The guide rail 10 in the present illustrated example further includes a lengthwise crosspiece 30 which extends over the entire length of the guide rail 10 and projects inwardly from its bottom 10. Because the crosspiece 30 is also fabricated by the cutting of the guide rail 10 to the desired length, the crosspiece 30 also has a sharp-edged face 32 which lies in the same plane as the face 15. In addition, this lengthwise crosspiece 10 is continued in the protective cap 16 in the form of an extension 31 of the lengthwise crosspiece 10. As can be seen, the external shape of the extension 31 is identical to that of the generally rectangular lengthwise crosspiece 30, the inner face of the extension 31 bordering the outer face of the lengthwise crosspiece 30, the corresponding boundary surface occurring at the sharp-edged face 32. The sharp edge of face 32 of the lengthwise crosspiece 30 is thus covered by the extension 31 of the lengthwise crosspiece 30. As can also be seen, the extension 31 also includes an insertion bevel 33 which is V-shaped in cross section as shown in FIG. 1. The insertion bevel 33 serves a similar purpose as the insertion bevels 26, 27,28,29, namely to ensure the smooth movement or smooth running of the guide elements or drive elements.

In the manner described above, the guide rail assembly 1 in accordance with the present invention ensures smooth running of the guide elements and drive elements into and out of the guide rail 10 over the protective cap 16. The present invention thus eliminates the additional wear to the drive elements and guide elements that run or move beyond the face 15 of the guide rail 10. The protective cap 16 can be made of variety of materials but is preferably made as an injected part from plastic. It should again be noted that whereas in the above, the protective cap 16 is made as a separate part, it may be injected directly onto the end of the guide rail 10. In addition, it should also be noted that in another embodiment, the locking of the protective cap 16 may be attained by providing projections on the guide rail 10 itself which are received within the holes, recesses or cavities provided on the protective cap 16. Moreover, in yet other embodiments, a centering journal (not shown) can be integrally molded on the protective cap 16 to support the guide rail assembly 1 to a carrier component (not shown) which is adapted to hold the guide rail assembly 1.

While various embodiments in accordance with the present invention have been shown and described, it is understood that the invention is not limited thereto. These embodiments may be changed, modified and further applied by those skilled in the art. Correspondingly, this invention is not limited to the details shown and described previously but also includes all such changes and modifications which are encompassed by the appended claims.

We claim:

1. A guide rail assembly for guiding at least one of drive elements and guide elements of an openable roof part of a motor vehicle, said guide rail assembly comprising:
   a guide rail of metal with a cut edge on an end of said guide rail; said guide rail having a guide surface formed therein for guiding at least one of said drive and guide elements; and
   a protective cap on said end of said guide rail, said protective cap covering said cut edge of said end and having an inside wall which flushes aligns with an inside wall of said guide rail to thereby provide a flush and continuous extension of said guide surface.

2. The guide rail assembly of claim 1, wherein said protective cap is made of plastic.

3. The guide rail assembly of claim 1, wherein said protective cap is plugged onto said end of said guide rail.

4. The guide rail assembly of claim 3, wherein said protective cap includes at least one locking element which engages a complementary locking element provided on said end of said guide rail.

5. The guide rail assembly of claim 4, wherein said locking element of said protective cap is a projection and said complementary locking element on said end of said guide rail is at least one of a recess and a cavity.

6. The guide rail assembly of claim 3, wherein said protective cap includes an inwardly pointing face adapted to facilitate pushing of said protective cap onto said end of said guide rail.

7. The guide rail assembly of claim 3, wherein said protective cap includes insertion bevels which extends to an outwardly pointing face of said protective cap.

8. The guide rail assembly of claim 3, wherein said guide rail includes a lengthwise crosspiece which extends over a substantial length of said guide rail, and said protective cap includes an extension molded thereto which extends said lengthwise crosspiece through said protective cap.

9. The guide rail assembly of claim 3, wherein said protective cap includes a centering journal integrally molded on said protective cap to support said guide rail assembly to a carrier component.

10. The guide rail assembly of claim 1, wherein said protective cap is injected onto said end of said guide rail.

11. The guide rail assembly of claim 1, wherein said protective cap includes insertion bevels which extends to an outwardly pointing face of said protective cap.

12. A guide rail assembly for guiding at least one of drive elements and guide elements of an openable roof part of a motor vehicle, said guide rail assembly comprising:
    a guide rail of metal with a cut edge on an end of said guide rail; and
    a protective cap on said end of said guide rail, said protective cap covering said cut edge of said end and having an inside wall which flushes aligns with an inside wall of said guide rail to thereby provide a flush and continuous surface; wherein said guide rail includes a lengthwise crosspiece which extends over a substantial length of said guide rail, and said protective cap includes an extension molded thereto which extends said lengthwise crosspiece through said protective cap.

* * * * *